United States Patent Office 2,804,479
Patented Aug. 27, 1957

2,804,479

PROCESS FOR THE PRODUCTION OF PHENYL GLYCOL

Gerhard Käbisch, Hanau (Main), and Ulrich Hoffmann, Bad Homburg vor der Hohe, Germany, assignors to Deutsche Gold- und Silber-Scheideanstalt vormals Roessler, Frankfurt am Main, Germany No Drawing. Application December 27, 1955, Serial No. 555,303

Claims priority, application Germany January 5, 1955

6 Claims. (Cl. 260—618)

The present invention relates to an improved process for the production of phenyl glycols and particularly to the production of such glycols using styrene oxide or styrene oxide substituted in the phenyl nucleus or substituted in the side chain with alkyl or aryl radicals as starting materials.

Previously, phenyl glycol was prepared by saponification of styrene dihalides or styrene halohydrins. Phenyl glycol can also be prepared by reduction of mendelic acid or benzoyl carbinol or by adding hydrogen peroxide onto styrene. These processes have, however, found no technical application as either the yields are too low or the starting materials are too difficult to prepare.

According to the invention, it was found that phenyl glycol, phenyl glycol substituted in the phenyl nucleus or phenyl glycol substituted in the side chain with alkyl or aryl radicals can be produced in good yields by adding water onto styrene oxide or its substitution products in the presence of small quantities of catalysts in the liquid phase reaction. Expediently, such addition reaction is carried out by adding styrene oxide or its substitution products to the water containing the catalyst with stirring. It is also expedient to maintain a large excess of water in the reaction mixture in order to prevent the addition of styrene oxide to the phenyl glycol already produced with the production of di- and tri-polyphenyl glycol. Preferably, the reaction is carried out at temperatures below 100° C.

Substances of acid reaction are active catalysts for the process according to the invention. Suitable acid reacting substances, for example, are inorganic or organic acids, such as, sulfuric acid, oxalic acid, phosphoric acid, perchloric acid, organic sulfonic acids and the like, which usually are active at lower temperatures and at lower concentrations, and acid reacting salts, such as, nickel sulfate, zinc sulfate, potassium bisulfate and the like. Even the very weakly acid reacting finely divided silicic acid promotes the reaction of styrene oxide with water at low temperatures. The quantity of catalyst required usually is less than 2% calculated upon styrene oxide. When strong inorganic oxygen acids, such as, $H_2SO_4$, are employed as catalysts, it is preferable to work at a pH below 4.

The yields obtainable with the process according to the invention are over 80%. This result is very unexpected as previously it was assumed that the reaction could not be carried out in the acid range because of aldehyde formation. The phenyl glycols produced according to the invention can be recovered from the reaction mixture in various ways as is evident from the examples given below.

The process according to the invention can be carried out as a continuous or batch process. When the process is carried out continuously, a portion of the dilute phenyl glycol solution produced can be continuously withdrawn from the reaction vessel and introduced into a distillation apparatus serving to concentrate such solution, for example, by azeotropic distillation, with an organic solvent such as benzene.

Phenyl glycol is a valuable starting material for the production of its esters, phenyl acetaldehyde, mandelic acid and secondary phenyl ethyl alcohols. It also can be used as a textile assistant for improving vegetable fibers.

The following examples illustrate several modifications of the process according to the invention:

*Example 1*

3 drops of sulfuric acid were dissolved in 1 liter of water and 500 grams of styrene oxide were added thereto drop by drop with vigorous stirring at such a rate that a reaction temperature of 40–45° C. was maintained. After all of the styrene oxide had been added, the sulfuric acid was precipitated as a Ca or Ba salt. The remaining solution was then concentrated under vacuum at temperatures up to 70° C. The residue was purified by distillation under vacuum (the boiling point of phenol glycol at 2 mm. Hg is 116° C.). Alternately, the residue can be purified by recrystallization from benzene. 465 grams of phenyl glycol with a melting point of 67° C. were obtained.

*Example 2*

3 drops of sulfuric acid were dissolved in 1 liter of water and 500 grams of styrene oxide were added thereto drop by drop with vigorous stirring at such a rate that a reaction temperature of 70–75° C. was maintained. After all of the styrene oxide had been added, the reaction mixture was neutralized with sodium bicarbonate. The reaction mixture was then cooled to 10° C., whereupon the main quantity of phenyl glycol could be stirred out. The resulting crystal pulp was vacuum filtered. A further quantity of phenyl glycol could be obtained from the filtrate by concentration thereof or by extraction. It, however, can be recycled to the reaction after acidification for reaction with further quantities of styrene oxide. If, instead of cooling the neutralized reaction mixture to 10° C., it is allowed to stand at room temperature, crystallization of the phenyl glycol also occurs but only after a longer period of time.

*Example 3*

1 gram of concentrated sulfuric acid was dissolved in 1 liter of water, and 500 grams of 1 phenyl-1-methyl-1,2 epoxyethane were run in over a period of 30 minutes with stirring while maintaining a reaction temperature of 45° C. The reaction mixture was stirred for a further hour and then was neutralized with sodium bicarbonate. The neutralized reaction mixture was separated in a separatory funnel. The glycol layer was purified by distillation. The purified glycol had a melting point of 40° C., a boiling point of 122° C. at 3 mm. Hg and an index of refraction $n_D^{20}=1.5476$.

*Example 4*

A mixture of 60 grams of m-methyl styrene oxide and 40 grams of p-methyl styrene oxide were treated in the same manner as the epoxyethane in Example 3. The glycol produced had a boiling point of 138–145° C. at 3 mm. Hg and an index of refraction $n_D^{20}=1.5450$.

We claim:

1. A process for the production of phenyl glycol which comprises reacting a styrene oxide with at least the stoichiometric quantity of water in the liquid phase in the presence of a relatively small quantity of an acid reacting catalyst.

2. The process of claim 1 in which said reaction is carried out at a temperature below 100° C.

3. The process of claim 1 in which the reaction is carried out by introducing the styrene oxide into an excess of water containing the acid reacting catalyst.

4. The process of claim 3 in which a portion of the aqueous phenyl glycol solution produced is continuously withdrawn from the reaction mixture and concentrated.

5. The process of claim 3 in which a portion of the aqueous phenyl glycol solution produced is continuously withdrawn from the reaction mixture and concentrated by azeotropic distillation.

6. The process of claim 1 in which the quantity of acid reacting catalyst is less than 2% calculated upon the styrene oxide.

References Cited in the file of this patent

UNITED STATES PATENTS

| | | |
|---|---|---|
| 2,086,077 | Groll et al. | July 6, 1937 |
| 2,650,940 | Young | Sept. 1, 1953 |